Patented Oct. 21, 1941

2,260,276

UNITED STATES PATENT OFFICE 2,260,276

ELECTROLYTIC PREPARATION OF POWDERED SILK CONTAINING COLLOIDAL METALS

Reginald Wyatt Lawson and Edward Erlick Verdiers, London, England

No Drawing. Application April 21, 1939, Serial No. 269,238. In Great Britain April 26, 1938

3 Claims. (Cl. 204—10)

This invention relates to the production of a powder of natural silk.

It is well known to pulverise wool, silk or the like mechanically. This however requires a very tedious and expensive operation and only leads to products which have retained their fibrous character. Such a powder is unsuitable for various purposes, especially cosmetic. Also its adsorption property is very unsatisfactory. Silk has already been dissolved in suitable liquids and the solutions obtained have been added to soaps. However, by reason of its conversion into solutions the initial substance has entirely lost its own particular character.

The invention has for its object to produce an impalpable powder of natural silk, hereinafter referred to as silk powder. This silk powder has an excellent adsorbing property and can be used for the same purposes as activated carbon or silicon gel. It can also be used as a powder and be admixed with other cosmetic preparations such as preparations for treating the hair, toilet creams, tooth-paste and the like. The properties of the powder, as also of the preparations produced therewith, may be further improved when the silk, during the course of its preparation is charged, preferably electrolytically, with colloidal metals, if desired under the action of a radiation.

By the invention the silk is converted from its fibrous condition into an impalpable powder of the greatest fineness, which has the properties of an atomised body of large surface tension, to a very prominent extent. The adsorption property of the silk powder, together with its surface tension, can be used for enriching the surface of the separate silk particles with activated metal colloids, preferably electrolytically, if desired whilst simultaneously or subsequently subjecting it to the rays of radio-active substances or X-rays.

For the production of the silk powder according to the present invention, natural silk, after being first freed in the known manner from all foreign and undesirable substances, including silk glue, is subjected to the action of breaking-up or decomposing agents, especially aqueous alkalies or acids, for example sodium hydroxide, sulphuric acid or hydrochloric acid, of suitable concentration. The action is however interrupted before the silk has been broken-up completely and then the operation is made retrograde by a medium having a retrograde action. When using an alkali as a decomposing medium the reaction product is neutralised by means of a corresponding quantity of acid, for example sulphuric acid or hydrochloric acid, whereby the silk is formed into a fine slime.

This slime is washed with water. After washing the slightly salt acid suspension is subjected between a metal anode, preferably consisting of an alloy of 10% copper, 20% gold and 70% silver, and an aluminium cathode, to the action of an electric direct current of from 10 to 12 volts, if desired preferably while being subjected to radiation, until the desired quantity of metal colloids has been absorbed by the silk particles. This charging may also be effected in other ways. The activated silk slime is then dried in chambers and finally is ground in a suitable mill, for example a pestle and mortar mill, to an impalpable powder.

The period of time during which the silk is treated with the solutions by which it is broken up or softened, depends on the quality and the condition of the initial material. It fluctuates between 24 to 96 hours and on an average 48 hours. For breaking-up or loosening the silk there is used for example sodium or potassium hydroxide as a 10% aqueous solution, 1 kilogramme of purified silk being mixed with 10 litres of this solution. The treatment may be carried out without heating but is considerably accelerated by the application of heat. Thus for example it is sufficient to boil for from 10 to 40 minutes 1 kg. of silk in a 2% soda lye. When it is desired to dye the powder this is preferably effected by directly dyeing the wet silk slime in a dye lye. Very small quantities of dyestuff are sufficient for this purpose.

The silk powder may be used alone or admixed with other substances and taken internally or applied externally for producing therapeutic and cosmetic actions as it has a considerable pleasing effect on the tissues, penetrating property and disinfectant action.

We claim:

1. In a process for the production of natural silk powder wherein the silk, after being first freed from all foreign and undesirable substances, including silk glue, is subjected to the action of breaking up or decomposing agents, which action is interrupted before the silk has been broken up or decomposed completely by treating the silk with a medium having a neutralising action so as to convert the mass into a fine slime of colloidal particles, whereupon the silk is dried and ground, the step consisting in subjecting the fine slime, before drying and grinding, to the action of an electric current between a metal anode, consisting of an alloy of copper, gold and silver, and an aluminium cathode whereby metal colloids from said anode are absorbed by the particles of said fine silk slime.

2. A process according to claim 1, wherein the metal anode consists of an alloy of 10% copper, 20% gold and 70% silver.

3. A process according to claim 1, wherein the electric current is a direct current of from 10 to 12 volts.

REGINALD WYATT LAWSON.
EDWARD ERLICK VERDIERS.